J. KEMP.
Grinding Mill.

No. 51,596.

Patented Dec. 19, 1865.

Witnesses:
Theo Tusch
Wm Trewin

Inventor:
John Kemp
per Munn & Co.
Attys.

UNITED STATES PATENT OFFICE.

JOHN KEMP, OF BROOKLYN, NEW YORK.

IMPROVEMENT IN GRINDING-MILLS.

Specification forming part of Letters Patent No. 51,596, dated December 19, 1865.

*To all whom it may concern:*

Be it known that I, JOHN KEMP, of Brooklyn, Kings county, State of New York, have invented a new and useful Improvement in Mills for Grinding Wheat, &c.; and I do hereby declare that the following is a full, clear, and exact description thereof, which will enable others skilled in the art to make and use the same, reference being had to the accompanying drawings, forming part of this specification, in which—

Figure 1:
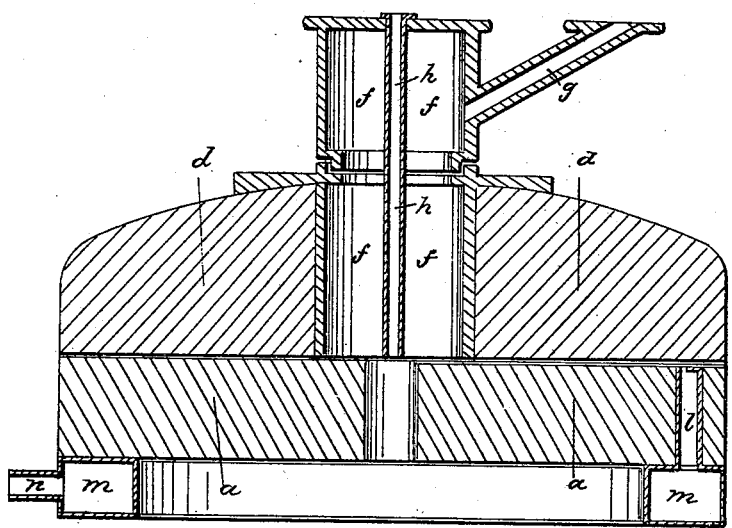
Figure 2:
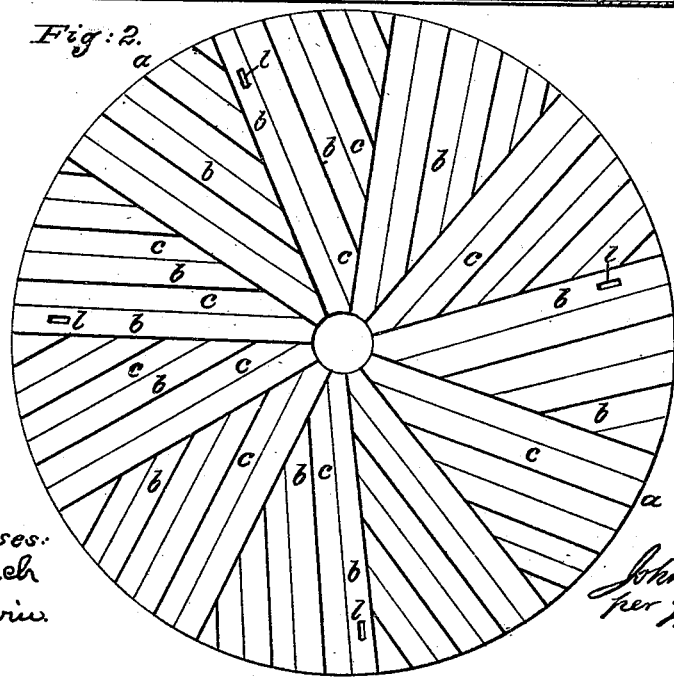

Figure 1 represents a central vertical section of my improvement; Fig. 2, a plan or top view of the upper surface of the lower millstone.

Similar letters of reference indicate like parts.

The present invention consists in a novel manner of feeding to and between the grinding-surfaces of the ordinary millstones used for the grinding of wheat one or more currents of cool air, or any other suitable cooling medium, for the purpose of preventing the heating of the stones to a great degree by their friction, and thus enable a much better result or product from the mill to be obtained than possible by the ordinary wheat-mill, as well as also preventing the deterioration of the grinding-stones from use.

$a$ $a$ in the drawings represent the lower millstone, having its upper surface formed with a series of grooves, $b$ $b$, &c., and lands $c$ $c$, &c., as in ordinary stones used for that purpose, and over which is the ordinary upper stone, $d$, to which a rotary motion is imparted by any proper means. Between the two stones the wheat to be ground is placed.

Within the central portion of the upper stones, and extending entirely through the same, an air-chamber, $f$, is formed, into which chamber air is forced through a short pipe, $g$, passing downward therein and impinging against the upper surface of the lower stone, where it spreads and diffuses itself entirely over the same, and between it and the upper stone, $h$, is the pipe or tube through which the wheat to be ground is fed to the grinding-stones.

In lower stone, and passing entirely through the same, a series of tubes, $l$ $l$, &c., are formed, their upper ends opening into the grooves $b$ $b$, &c., of the same, and communicating at their lower ends with a circular air-box, $m$ $m$, placed below the stone and extending entirely around under the same, to which air-box $m$ air is admitted through a supply-tube, $n$, connecting it with any suitable air-pump, and from which it passes upward through the tubes $l$ $l$, &c., to and between the grinding-stones, where it diffuses itself, as before described in the case of the air-chamber $f$ of the upper stone.

By thus passing air through the millstones and diffusing it around and between the two, as described, the stones are prevented from becoming heated, and also the wheat being ground therein, whereby a much better product can be produced than by the ordinary mode, and, besides, the stones will wear much longer and do not so quickly deteriorate as heretofore.

There may be any number of the air-tubes in the lower stone, as may be desired; but with too many its strength would be impaired, and also the same may be remarked of the upper stone, and therefore I do not intend to limit myself to any particular number or size of air tubes or chambers within the stones and communicating with the grinding-surfaces.

I claim as new and desire to secure by Letters Patent—

The described method of introducing air between the surfaces of the stones, consisting of an upper supply derived through the eye of the runner and a lower supply derived from a chamber under the bed-stone through air-ducts in the latter, which open into the grooves of the same, as described and represented.

JOHN KEMP.

Witnesses:
M. M. LIVINGSTON,
ALBERT W. BROWN.